US011074508B2

(12) United States Patent
Zhu et al.

(10) Patent No.: US 11,074,508 B2
(45) Date of Patent: Jul. 27, 2021

(54) CONSTRAINT TRACKING AND INFERENCE GENERATION

(71) Applicant: International Business Machines Corporation, Armonk, NY (US)

(72) Inventors: Huaiyu Zhu, Union City, CA (US); Michael James Wehar, Amherst, NY (US); Marina Danilevsky Hailpern, San Jose, CA (US); Mauricio Antonio Hernandez-Sherrington, Gilroy, CA (US); Yunyao Li, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 15/939,732

(22) Filed: Mar. 29, 2018

(65) Prior Publication Data

US 2019/0303772 A1   Oct. 3, 2019

(51) Int. Cl.
*G06N 5/04* (2006.01)
(52) U.S. Cl.
CPC ..................................... *G06N 5/04* (2013.01)
(58) Field of Classification Search
None
See application file for complete search history.

(56) References Cited

U.S. PATENT DOCUMENTS

| 9,424,533 | B1 | 8/2016 | Zadeh |
| 2017/0109644 | A1 | 4/2017 | Nariyambut Murali et al. |

OTHER PUBLICATIONS

Rush, Improved Parsing and POS Tagging Using Inter-Sentence Consistency Constraints, In Proceedings of the 2012 Joint Conference on Empirical Methods in Natural Language Processing and Computational Natural Language Learning, 2012, pp. 1434-1444 (Year: 2012).*
Roark, Finite-State Chart Constraints for Reduced Complexity Context-Free Parsing Pipelines, Computational Linguistics 38 (4), 2012, 719-753 (Year: 2012).*
Pujara, J. et al., Knowledge Graph Identification, International Semantic Web Conference, 2013.

(Continued)

*Primary Examiner* — Wilbert L Starks
(74) *Attorney, Agent, or Firm* — Ryan, Mason & Lewis, LLP

(57) ABSTRACT

Methods, systems, and computer program products for constraint tracking and inference generation are provided herein. A computer-implemented method includes parsing descriptions of one or more user-provided constraints pertaining to data within a target system, parsing truth value assignments to the user-provided constraints, and deriving a truth value for at least one of the user-provided constraints that does not correspond to a known truth value, wherein said deriving comprises performing a logical inference utilizing known truth values of one or more of the user-provided constraints. The computer-implemented method also includes storing, in a database, (i) the user-provided constraints, (ii) the known truth values, and (iii) the at least one derived truth value, and outputting the at least one derived truth value, one or more identified contradictions among the known truth values, and/or an indication that one or more unknown truth values corresponding to the user-provided constraints remain unknown.

20 Claims, 7 Drawing Sheets

(56) References Cited

OTHER PUBLICATIONS

Cronin, T., Using the Assumption-Based Truth Maintenance System to Switch Context during Data Fusion Processing, 1991.

IP.com, IPCOM000235640D, System and Method for User Defined and Dynamic Control of Confidence Versus Performance in Complex Analytical Processing Pipelines, Mar. 17, 2014.

Hofford, G., Introduction to ROSS: A New Representational Scheme, 2014.

IP.com, IPCOM000243543D, Method for Test Scenario Confidence Level Calculation, Sep. 20, 2015.

Chalamalla et al., Descriptive and prescriptive data cleaning. In Proceedings of the 2014 ACM SIGMOD International conference on Management of Data, 445-456, 2014.

Chu et al., "Holistic data cleaning: Putting violations into context," Data Engineering (ICDE), 2013 IEEE 29th International Conference on, Brisbane, QLD, 2013, pp. 458-469.

Chu et al., Discovering denial constraints. Proc. VLDB Endow. 6, 13 (Aug. 2013), 1498-1509.

Dallachiesa et al., NADEEF: a commodity data cleaning system. In Proceedings of the 2013 ACM SIGMOD International Conference on Management of Data, 541-552, 2013.

Fan et al., Conditional functional dependencies for capturing data inconsistencies. ACM Trans. Database Syst. 33, 2, Article 6 (Jun. 2008), 48 pages.

Ilyas et al., Trends in Cleaning Relational Data: Consistency and Deduplication. Found. Trends databases 5, 4 (Oct. 2015), 281-393.

Kandel et al., 2012. Profiler: integrated statistical analysis and visualization for data quality assessment. In Proceedings of the International Working Conference on Advanced Visual Interfaces (AVI '12), Genny Tortora, Stefano Levialdi, and Maurizio Tucci (Eds.), 547-554, 2012.

Kontokostas et al., Test-driven evaluation of linked data quality. In Proceedings of the 23rd international conference on World wide web, 747-758, 2014.

Geerts et al., The LLUNATIC data-cleaning framework. Proc. VLDB Endow. 6, 9 (Jul. 2013), 625-636.

Golab et al., On generating near-optimal tableaux for conditional functional dependencies, 2008.

\* cited by examiner

```
table runlog := JSON("run.log")
   with schema  { runid: integer, component: string,
                input_gb: integer, output_gb: integer,
                start_time: integer, end_time: integer}
define constraint1 := All x in A: All y in B:
   (x.runid = y.runid) & (x.component="A") & (y.component="B") & (x.output_gb<=100)
   -> (y.end_time - y.start_time <= 20*60)
assume constraint1 true
```

302

```
table C := JSON("Company.json")
table PM := JSON("PublicMetric.json")
table PMD := JSON("PublicMetricData.json")
table MN := SQL("select C.cid, PM.metric_namespace from C, PM, PMD
          where C.cid = PMD.cid and PM.mid = PMD.mid")
define gaap := All x in MN: RegexFind("us-gaap" , x.metric_namespace)
validate gaap
```

CONSTRAINT TRACKING AND INFERENCE GENERATION

FIELD

The present application generally relates to information technology (IT), and, more particularly, to software quality control within IT systems.

BACKGROUND

Many software systems are built from components of diverse constructions. For example, consider a data analytics system that can include numerous analytics and transformation components. Such a system can build up data models from multiple and heterogeneous input data sets, and there are commonly various constraints underlying the design of the workflow. Such constraints can often include constraints that cannot be represented using data schema, as such constraints may relate, for example, to data produced in different parts of the system, wherein different components may be implemented using different programming languages and different computational models. However, existing approaches are unable to simultaneously describe constraints across these types of boundaries, formalize constraints so that constraints can be validated against data, derive the truth values of constraints, or track the evolution of constraints and their truth values over time.

SUMMARY

In one embodiment of the present invention, techniques for constraint tracking and inference generation are provided. An exemplary computer-implemented method can include parsing one or more descriptions of one or more user-provided constraints pertaining to data within a target system, parsing truth value assignments to at least a portion of the one or more user-provided constraints, and deriving a truth value for at least one of the one or more user-provided constraints that does not correspond to a known truth value, wherein the deriving comprises performing a logical inference utilizing one or more known truth values of one or more constraints related to the one or more user-provided constraints. Such a method can also include storing, in a database, (i) the one or more user-provided constraints, (ii) the one or more known truth values, and (iii) the at least one derived truth value. Additionally, such a method can include outputting, to at least one user, at least one of (i) the at least one derived truth value, (ii) one or more identified contradictions among the one or more known truth values, and (iii) an indication that one or more unknown truth values corresponding to one or more of the user-provided constraints remain unknown.

In another embodiment of the invention, an exemplary computer-implemented method can include obtaining, from at least one user, one or more descriptions of a set of one or more data constraints pertaining to data within a target system, and parsing the one or more descriptions into one or more data representations from a set of multiple pre-established data representations. Such a method also includes determining a truth value for at least one of the one or more data constraints by validating the one or more data representations against the data within the target system, and identifying one or more contradictions among the one or more determined truth values by performing a logical inference on (i) the at least one determined truth value and (ii) one or more previously-assigned truth values associated with the one or more user-provided data constraints. Additionally, such a method also includes outputting the one or more identified contradictions to at least one user, updating the set of one or more data constraints, based on user input in response to the one or more identified contradictions, by at least one of (i) adding one or more data constraints, (ii) removing at least one of the one or more data constraints, and (iii) modifying at least one of the one or more previously assigned truth values, and repeating, using the updated set of one or more data constraints, the above-noted steps of (i) obtaining, (ii) parsing, (iii) determining, (iv) identifying, and (v) outputting.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
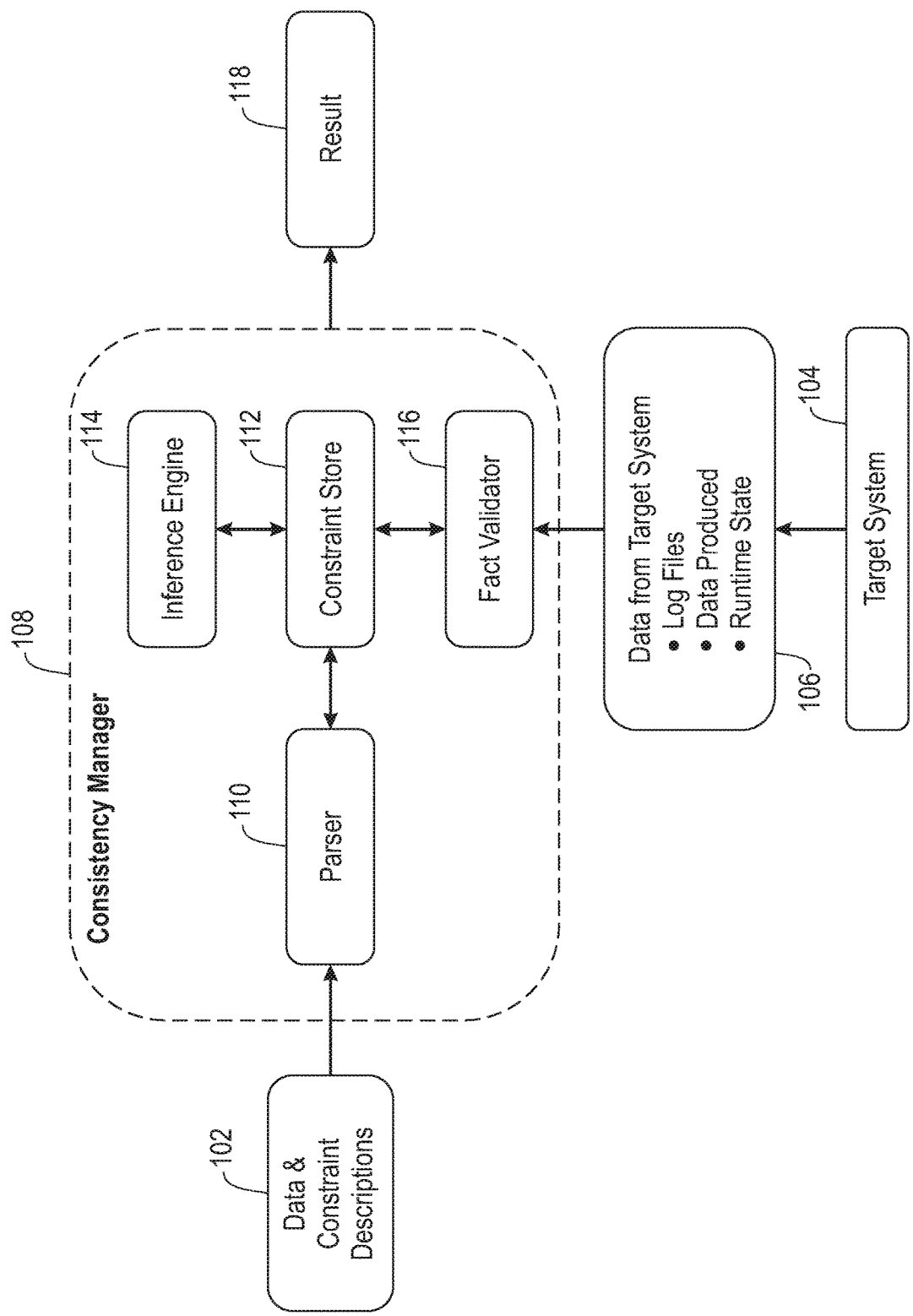
FIG. 1 is a diagram illustrating system architecture, according to an exemplary embodiment of the invention.

As described herein, an embodiment of the present invention includes constraint tracking and inference generation. At least one embodiment of the invention includes constructing a constraint tracking system (also referred to herein as a tracking system) to track constraints of a target system (which can include heterogeneous components). Also, the constraints expressed via one or more embodiments of the invention can also serve, for example, as formalized documentation for the target system.

At least one embodiment of the invention can include enabling users to incrementally formalize and keep consistent one or more constraints pertaining to a target heterogeneous workflow system. As further detailed herein, such an embodiment allows users to express real-world properties and constraints as formal logical predicates, on-demand and incrementally. Additionally, such an embodiment facilitates obtaining the truth values of predicates via automatic validation against actual target system data, and validates the consistency of assumptions and constraints pertaining to the target system by performing a logical inference to derive truth values of predicates and to detect contradictions. Further, such an embodiment can also record the provenance of such inferences to help focus on problem areas.

As used herein, a truth value, once determined, is either "true" or "false," or the truth value can be "unknown" before it has a fixed (determined) value. In one or more embodiments of the invention, such as detailed in the preceding paragraph, each constraint is initially assigned an "unknown" truth value, which can subsequently be modified to "true" or "false" in multiple ways, such as, for example: (1) user input specifies a constraint as true or false, (2) validation against data, and/or (3) derivation using logical inference from known values of one or more other constraints.

In at least one embodiment of the invention, constraints are expressed (by the user, for example) as logical expressions involving predicates on target system data. Additionally, constraint descriptions can be independent of the implementation language(s) of the target system. By way merely of example, consider a workflow engine as a target system. In such an example, the predicates on data can be implemented as test programs that return "true" or "false" based on the data passing through the system. In another example, consider a software deployment process as a target system. In such an example, the predicates on data can be implemented as tests on the log files generated in the process. The predicates on data can also be represented using query languages on structured data. Also, the logical expressions can involve any second order logic constructs (involving logical connectives and quantifiers, for example).

In one or more embodiments of the invention, any constraints having truth values that are of interest to the user can be inserted and/or utilized. It is not required that the constraints are satisfied (being true), as the user may assign the truth values to some constraints while leaving the truth values of other constraints unknown. The user may also request the truth value of a constraint to be obtained by validation against the target system data. Additionally, the constraints and corresponding truth values can be stored in a constraint store (as further detailed in connection with FIG. 1), along with history and provenance of truth value assignments. As used herein, "provenance" refers to information regarding previously known truth values that caused the current truth value assignment. By way merely of illustration, consider an example wherein C="A implies B," and wherein C=false. The provenance for this example can include the following: C is derived as false because A=true and B=false. Given the provenance for each constraint such as the above example, one or more embodiments of the invention can include tracing the origin of truth values.

The truth values obtained by validation against data can also have associated provenance information. For example: assume an embodiment wherein a predicate is (x>2), and data of x=1. Such an embodiment can produce a truth value of "false," and also a record x=1. In another example, assume an embodiment wherein a predicate is (for all x, x>2), and data of the set $\{1, 2, 3, 4, 5\}$. Such an embodiment can produce a truth value of "false," and a record x=1 as one example. In a different example, the predicate is (exists x: x>2) and the data include the set $\{1, 2, 3, 4, 5\}$. Such an example can produce a truth value of "true" and also a record of x=3, for instance. Note that the quantifier in this example is "exists," and not "for all." That is why the truth value in this example is "true" instead of "false" for the same data as the previous example.

As further detailed below in connection with FIG. 1, in at least one embodiment of the invention, the tracking system can perform logical inferences on the truth values of provided and/or selected constraints. The tracking system can also verify that the known truth values do not form a contradiction, and for constraints with unknown truth values, the tracking system can derive true/false values for one or more of such constraints as logical consequences of known values. The derived values can also be stored in a constraint store with corresponding information pertaining to provenance of derivation.

Additionally, the tracking system can continue to accept new constraints from the user and/or remove existing constraints from the system. With any modification of the constraints, including insertion, updating, and/or removal of constraints, the derived values of other constraints directly or indirectly related to such modified constraints can be re-evaluated. Such re-evaluation allows the constraints pertaining to the target system to be accumulated over time.

FIG. 1 is a diagram illustrating system architecture, according to an embodiment of the invention. By way of illustration, FIG. 1 depicts a consistency manager 108, which includes a parser 110, a constraint store 112, an inference engine 114, and a fact validator 116. As also depicted in FIG. 1, inputs to the consistency manager 108 include data and constraint descriptions 102, and data 106 (which can include, for example, log files, produced data, run-time state information, etc.) from a target system 104. Based on such inputs, the consistency manager, as further detailed below, outputs a result 118.

In connection with one or more embodiments of the invention (including the example embodiment depicted in FIG. 1), the following terms can be used as noted. For example, a workflow refers to a task that requires multiple steps to accomplish, wherein the steps may be dependent on each other, and the functionality of each step can be developed by independent actors/users. Data, as used in connection with one or more embodiments of the invention, can include structured data representing aspects of a target system. Also, a fact can refer to a statement about data that can be directly verified to be either true or false. A constraint, as used herein, refers to a logical expression involving one or more facts and/or one or more other constraints.

Referring again specifically to FIG. 1, the constraint store 112 stores constraints and associated information, such as, for example, facts about the provenance of the constraints. In one or more embodiments of the invention, each entry in the constraint store 112 can include, for example, logical content of the constraint, a truth value (which can be true, false, or unknown), and the history and provenance of the constraint's definition and truth value assignment. Logical content of the constraint can include a logical expression over predicates on target system data. By way of example, the logical expression can be represented as a parse tree, and the predicates on target system data can be represented as built-in and user-defined functions on data descriptors, while the data descriptors can be represented as queries on the data. Additionally, the truth value assignment can include a direct user assumption, a validation against data, or a derivation from known truth values of other constraints.

The parser 110 can accept and/or obtain user inputs that describe constraints and corresponding truth value assignments, and can also transform expressions about facts and constraints into internal representations. As noted above, such inputs 102 can include constraints expressed as logical expressions (wherein the logical expressions may involve logical connectives (not, and, or, implies, etc.) and quantifiers (for all, exists, etc.)), descriptions of a target system data and predicates thereon, as well as user instructions to assign truth values to constraints (by assumption or by validation against data) and to perform a logical inference.

The fact (and/or predicate) validator 116 can obtain the truth value of constraints by validating the predicates against data from the target system 104. By way of example, in one or more embodiments of the invention, the fact validator 116 can access data 106 from the target system 104 according to data descriptions, implement predicates using built-in functions and/or user defined functions, and check predicates on the target data 106 to obtain truth values.

Additionally, the (logical) inference engine 114 derives logical consequences from known truth values of the constraints, and detects one or more contradictions. Specifically, in one or more embodiments of the invention, the inference engine 114 can identify logical contradictions among the constraints, and can derive additional truth values for constraints with unknown values. Also, in at least one embodiment of the invention, the inference engine 114 is required to complete computation in bounded time, but is not required to derive all derivable logical consequences.

By way merely of illustration and not limitation, an example implementation of the inference engine 114 can include the following. The inference engine 114 can generate a graph from the constraints stored in the constraint store 112, wherein each logical expression and sub-expression corresponds to a node in the graph. Additionally, in such a graph, equivalent expressions are identified as the same node, and each pair of an expression and a direct sub-expression corresponds to an edge in the graph. Further, the inference engine 114 can update one or more nodes with known truth values (user-assigned or data-validated values) and check for contradiction among these values.

The inference engine 114 can also update additional node values via the following inference procedure. For each node with an updated truth value, the inference engine 114 determines if any logical connective in the graph neighborhood is violated, which implies a contradiction in the set of known truth values. If there is no contradiction, the inference engine 114 examines all nodes in the graph neighborhood with unknown truth values. For each such node, the inference engine 114 determines if setting the node's truth value to true or false would cause a contradiction with the truth values of the node's neighbors. If neither a true setting nor a false setting would cause contradiction, the truth value of the node remains unknown. If one of a true setting or false setting would cause a contradiction, the truth value of the node is derived to be the opposite value. If both a true setting and a false setting would cause a contradiction, a contradiction is detected among the known truth values of the node's neighbors. In one or more embodiments of the invention, this procedure can be performed recursively (by the inference engine 114) until no additional updates to truth values are obtained.

The consistency manager 108 coordinates the overall activities among the parser 110, the constraint store 112, the inference engine 114 and the fact validator 116, and enables that maintenance and evolution of formalized knowledge about the target system 104. The consistency manager 108 can carry out its functions, in one or more embodiments of the invention, via the following loop/sequence of events.

Initially, the consistency manager 108 can accept user inputs 102 and send such inputs to the parser 110 to parse. According to parsed user inputs, the consistency manager 108 can insert constraints and, optionally, assigned truth values, into the constraint store 112. Also, according to parsed user inputs, the consistency manager 108 can cause the fact validator 116 to validate constraints against target system data 106 to obtain truth values, and subsequently insert the results to the constraint store 112. Further, the consistency manager 108 can cause the inference engine 114 to infer one or more logical consequences from known truth values, and can subsequently present the results 118 back to the user.

Figure 2:
FIG. 2 is a diagram illustrating expression of a constraint, according to an exemplary embodiment of the invention.

FIG. 2 is a diagram illustrating expression of a constraint 202, according to an exemplary embodiment of the invention. The example constraint expression 202 of FIG. 2 illustrates how a real-world constraint can be expressed in the tracking system. The setting of the FIG. 2 example is a workflow system having two components, A and B, among other components, and an assumption of "In any run of the workflow, if the output of A is less than 100 GB, then the running time of B will be less than 20 minutes." Accordingly, such a description can be written in a formal language, such as depicted in expression 202 in FIG. 2.

Figure 3:
FIG. 3 is a diagram illustrating data description, according to an exemplary embodiment of the invention.

FIG. 3 is a diagram illustrating data description 302, according to an exemplary embodiment of the invention. The example data description 302 of FIG. 3 illustrates how a data description can involve relational operations as well as built-in and user-defined functions. The example data description 302 defines structured data read from JSON files, forms additional structured data using relational operation, forms constraints based on such data and one or more predicates, and validates the constraints.

Additionally, in one or more embodiments of the invention, a variety of predicates can be directly supported in formal language. Predicates can be defined, for example, through user-defined predicate functions.

Figure 4:
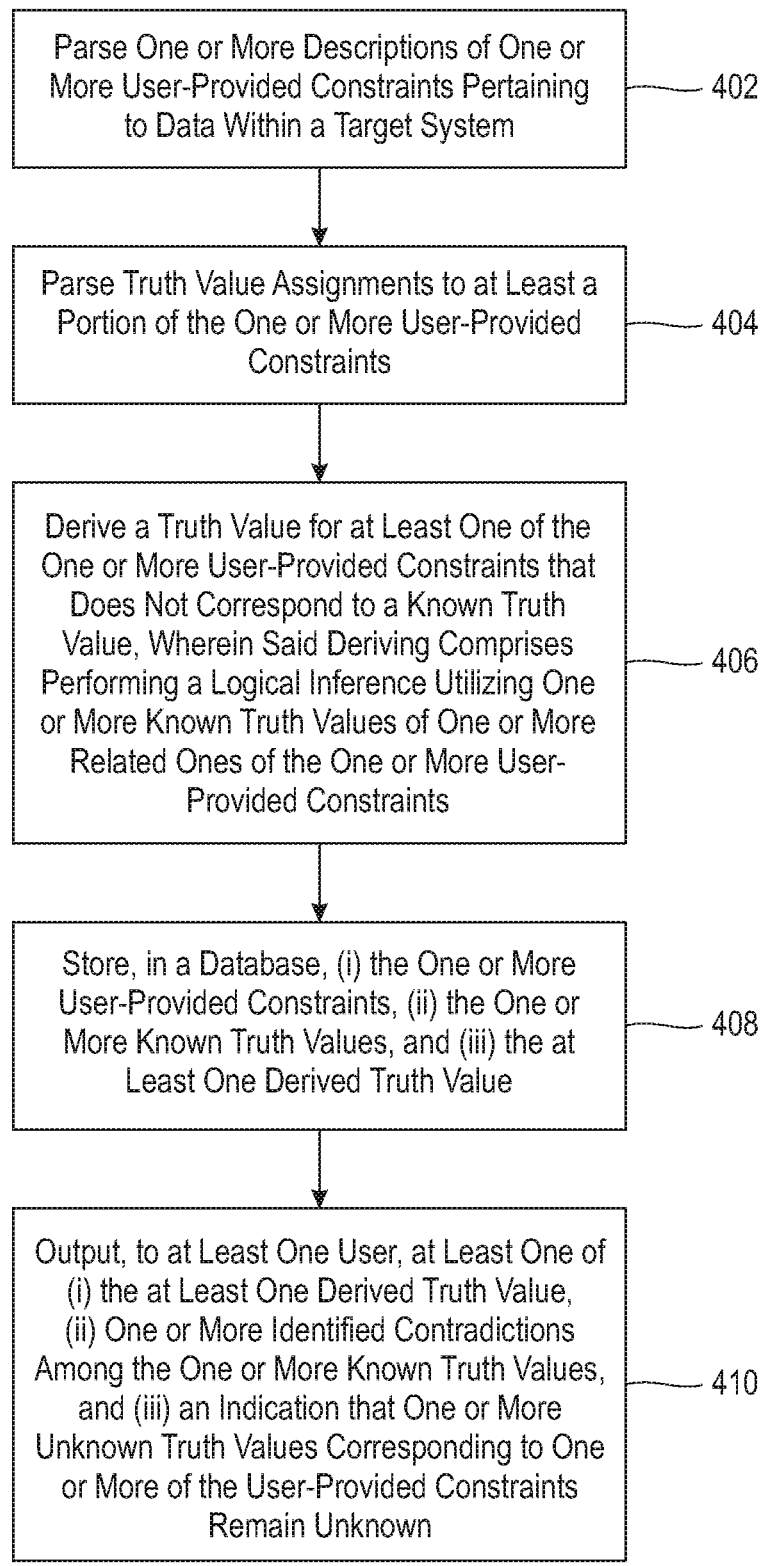
FIG. 4 is a flow diagram illustrating techniques according to an embodiment of the invention.

FIG. 4 is a flow diagram illustrating techniques according to an embodiment of the present invention. Step 402 includes parsing one or more descriptions of one or more user-provided constraints pertaining to data within a target system. The one or more descriptions can include one or more logical expressions having one or more predicates on the data within the target system. Also, the one or more predicates on the data in the target system can contain one or more quantifiers. Additionally, one or more of the truth value assignments can be based on validating the one or more predicates against the data within the target system.

Such quantifiers can include, for example, universal, existential and/or other types of quantifiers such as counting and/or proportion quantifiers. A "counting quantifier" example can include, for instance, a quantifier that states "there are at least 20 items that satisfy the condition." A "proportion quantifier" example can include, for instance, a quantifier that states "at most 30% of [a given element]." Additionally, a "universal quantifier" can include, for example, a quantifier that states a "for all" feature, such as "for all employees, employee.id is not null." Also, an "existential quantifier" can include, for example, a quantifier that states a "there exists" feature, such as "there exists an employee who is manager."

Step 404 includes parsing truth value assignments to at least a portion of the one or more user-provided constraints. Step 406 includes deriving a truth value for at least one of the one or more user-provided constraints that does not correspond to a known truth value, wherein said deriving comprises performing a logical inference utilizing one or more known truth values of one or more related ones of the one or more user-provided constraints. The one or more known truth values can include, for example, one or more assigned truth values. Also, deriving can be performed recursively until at least one of (i) a detection of a contradiction among the one or more known truth values and (ii) a determination that no unknown truth value can be derived.

Step 408 includes storing, in a database, (i) the one or more user-provided constraints, (ii) the one or more known truth values, and (iii) the at least one derived truth value. The determined truth values as well as the identification of remaining unknown values can be useful to a user. For example, such values represent properties of a target system discovered by the tracking system, and knowing some values can remain unknown while being consistent to all other constraints is additionally useful to users. For instance, such information can be used to identify gaps in design considerations, when the user thought that the system with existing constraints is guaranteed to have a certain property, but in fact that property could still be either true or false.

Step 410 includes outputting, to at least one user, at least one of (i) the at least one derived truth value, (ii) one or more identified contradictions among the one or more known truth values, and (iii) an indication that one or more unknown truth values corresponding to one or more of the user-provided constraints remain unknown.

As also detailed herein, at least one embodiment of the invention can also include outputting, to the at least one user, a textual explanation for (i) the one or more identified contradictions and (ii) the at least one determined truth value.

The techniques depicted in FIG. 4 can also include processing, in response to said outputting, at least one of (i) user feedback and (ii) one or more user instructions. At least one embodiment of the invention can also include storing one or more items of additional information related to the one or more known truth values and the at least one derived truth value. The one or more items of additional information can include user name and time.

Further, the techniques depicted in FIG. 4 can additionally include storing provenance information related to the one or more known truth values. Also, in response to a user request for a derived truth value, at least one embodiment of the invention can include searching the stored provenance information to identify one or more assigned truth values responsible for the derived value. Further, in response to a user request, for an identified contradiction among the one or more known truth values, at least one embodiment of the invention can include searching the stored provenance information to identify one or more assigned truth values responsible for the identified contradiction. Additionally, in response to a user request for an identified contradiction among the one or more known truth values, at least one embodiment of the invention can include identifying one or more assigned truth values that can be removed to result in removal of the identified contradiction.

Also, an additional embodiment of the invention includes obtaining, from at least one user, one or more descriptions of a set of one or more data constraints pertaining to data within a target system, and parsing the one or more descriptions into one or more data representations from a set of multiple pre-established data representations. Such an embodiment can also include determining a truth value for at least one of the one or more data constraints by validating the one or more data representations against the data within the target system, and identifying one or more contradictions among the one or more determined truth values by performing a logical inference on (i) the at least one determined truth value and (ii) one or more previously-assigned truth values associated with the one or more user-provided data constraints. Additionally, such an embodiment can also include outputting the one or more identified contradictions to at least one user, updating the set of one or more data constraints, based on user input in response to the one or more identified contradictions, by at least one of (i) adding one or more data constraints, (ii) removing at least one of the one or more data constraints, and (iii) modifying at least one of the one or more previously assigned truth values, and repeating, using the updated set of one or more data constraints, the above-noted steps of (i) obtaining, (ii) parsing, (iii) determining, (iv) identifying, and (v) outputting. Also, in one or more embodiments of the invention, the above-noted repeating step can further include repeating the step of updating the set of one or more data constraints.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
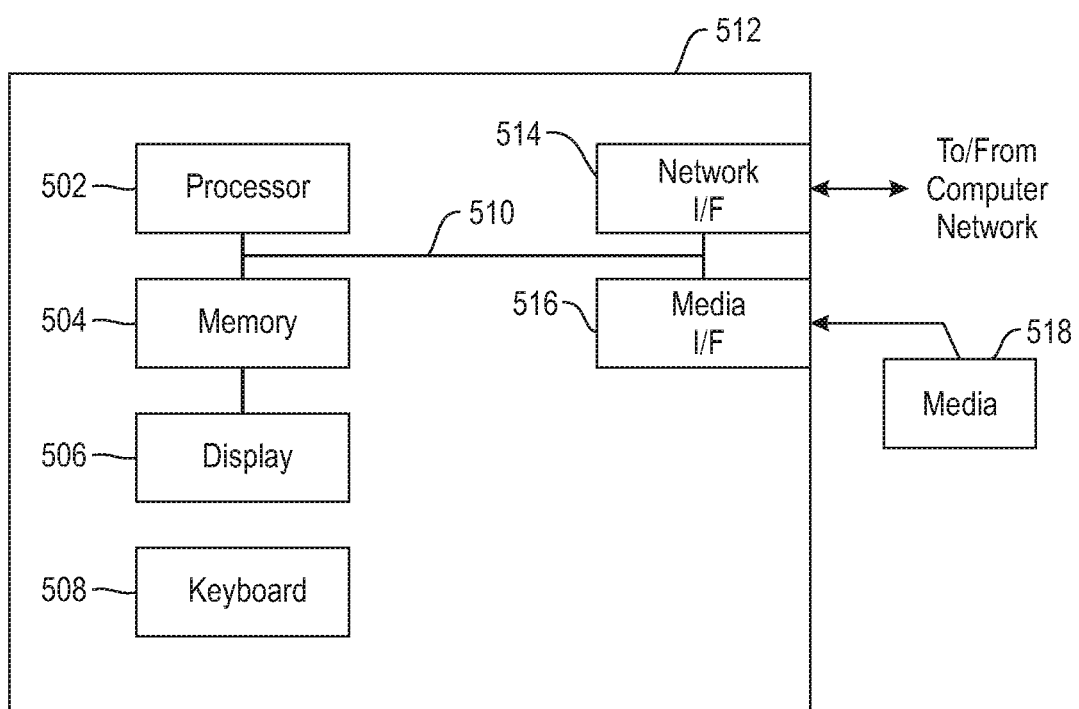
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
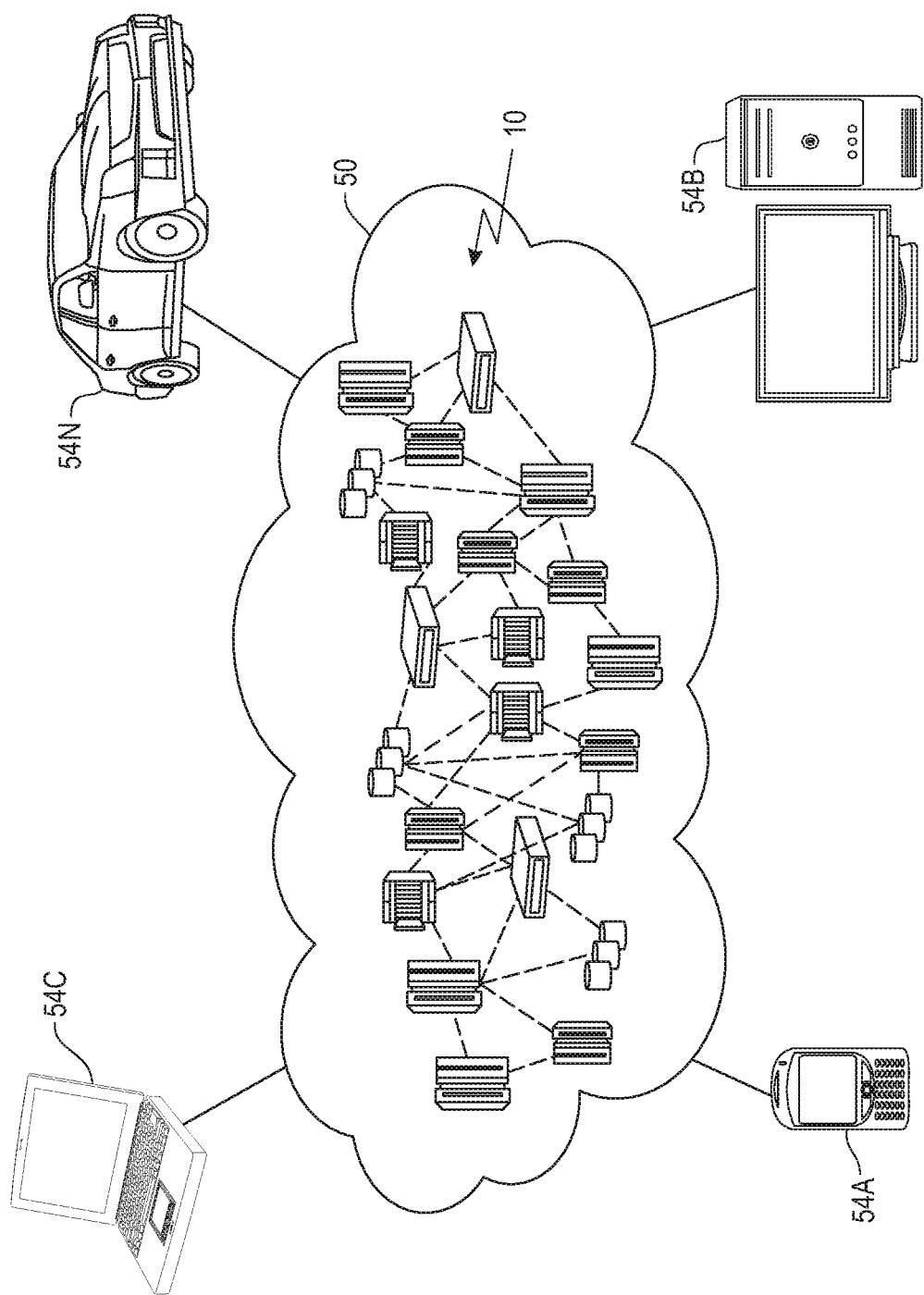
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
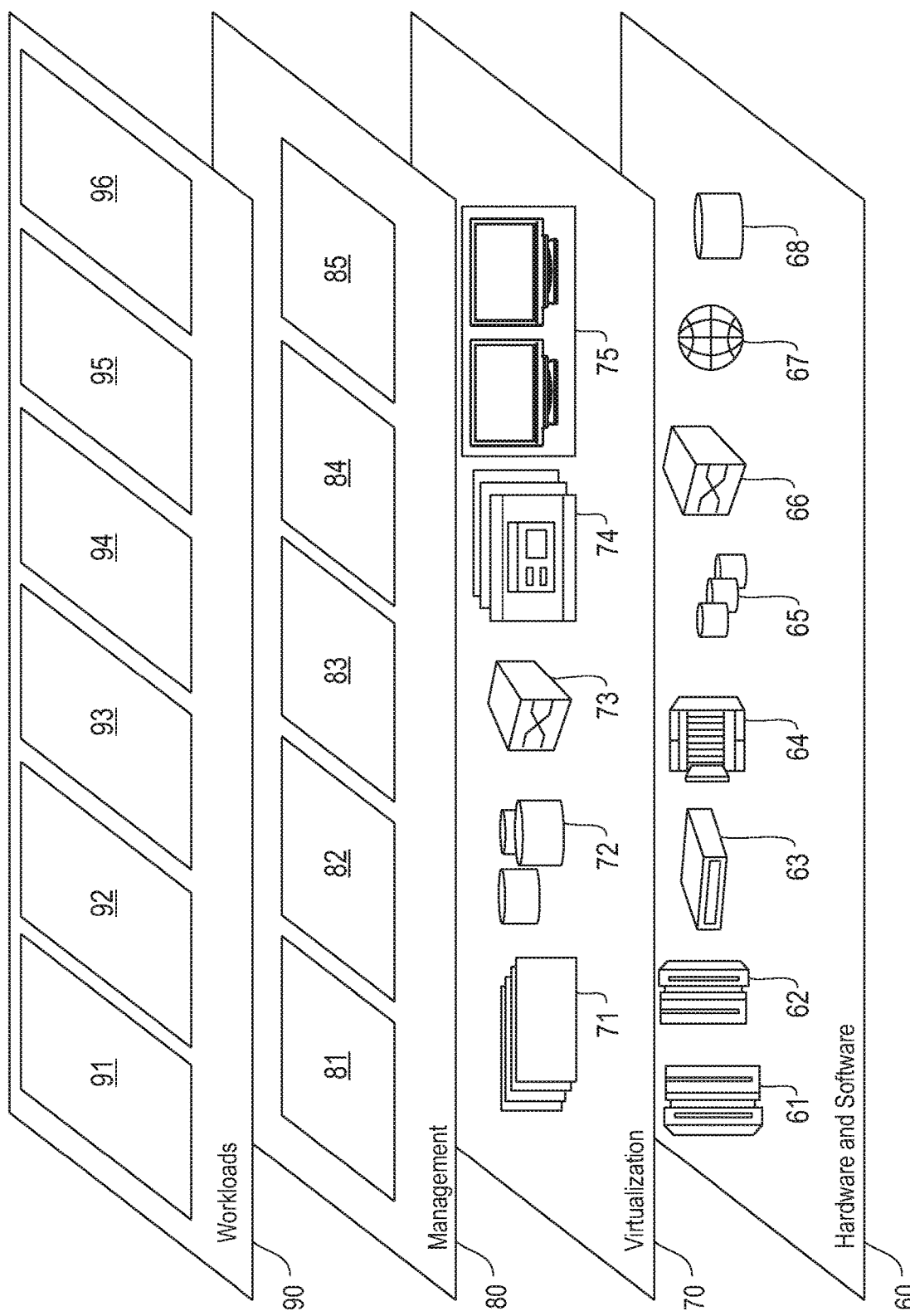
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and constraint tracking and inference generation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, allowing constraints that apply to various parts of a system to be brought together, such that the logical consequences from the collection of the constraints can be derived automatically.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising steps of:
    parsing one or more descriptions of one or more user-provided constraints pertaining to data within a target system;
    parsing truth value assignments to at least a portion of the one or more user-provided constraints;
    deriving a truth value for at least one of the one or more user-provided constraints that does not correspond to a known truth value, wherein said deriving comprises performing a logical inference utilizing one or more known truth values of one or more constraints related to the one or more user-provided constraints;
    storing, in a database, (i) the one or more user-provided constraints, (ii) the one or more known truth values, and (iii) the at least one derived truth value; and
    outputting, to at least one user, at least one of (i) the at least one derived truth value, (ii) one or more identified contradictions among the one or more known truth values, and (iii) an indication that one or more unknown truth values corresponding to one or more of the user-provided constraints remain unknown;
    wherein the steps are carried out by at least one computing device.

2. The computer-implemented method of claim 1, comprising:
    processing, in response to said outputting, at least one of (i) user feedback and (ii) one or more user instructions.

3. The computer-implemented method of claim 1, wherein the one or more known truth values comprise one or more assigned truth values.

4. The computer-implemented method of claim 1, wherein the one or more descriptions comprise one or more logical expressions having one or more predicates on the data within the target system.

5. The computer-implemented method of claim 4, wherein the one or more predicates on the data in the target system contain one or more quantifiers.

6. The computer-implemented method of claim 4, wherein one or more of the truth value assignments are based on validating the one or more predicates against the data within the target system.

7. The computer-implemented method of claim 1, wherein said deriving is performed recursively until at least one of (i) a detection of a contradiction among the one or more known truth values and (ii) a determination that no unknown truth value can be derived.

8. The computer-implemented method of claim 1, comprising:
    storing one or more items of additional information related to the one or more known truth values and the at least one derived truth value.

9. The computer-implemented method of claim 8, wherein the one or more items of additional information comprise user name and time.

10. The computer-implemented method of claim 1, comprising:
    storing provenance information related to the one or more known truth values.

11. The computer-implemented method of claim 10, comprising:
    in response to a user request for a derived truth value, searching the stored provenance information to identify one or more assigned truth values responsible for the derived value.

12. The computer-implemented method of claim 10, comprising:
    in response to a user request, for an identified contradiction among the one or more known truth values, searching the stored provenance information to identify one or more assigned truth values responsible for the identified contradiction.

13. The computer-implemented method of claim 10, comprising:
    in response to a user request for an identified contradiction among the one or more known truth values, identifying one or more assigned truth values that can be removed to result in removal of the identified contradiction.

14. A computer program product comprising a computer readable storage medium having program instructions embodied therewith, the program instructions executable by a computing device to cause the computing device to:
    parse one or more descriptions of one or more user-provided constraints pertaining to data within a target system;
    parse truth value assignments to at least a portion of the one or more user-provided constraints;
    derive a truth value for at least one of the one or more user-provided constraints that does not correspond to a known truth value, wherein said deriving comprises performing a logical inference utilizing one or more known truth values of one or more constraints related to the one or more user-provided constraints;
    store, in a database, (i) the one or more user-provided constraints, (ii) the one or more known truth values, and (iii) the at least one derived truth value; and
    output, to at least one user, at least one of (i) the at least one derived truth value, (ii) one or more identified contradictions among the one or more known truth values, and (iii) an indication that one or more unknown truth values corresponding to one or more of the user-provided constraints remain unknown.

15. The computer program product of claim 14, wherein the program instructions executable by a computing device further cause the computing device to:
    process, in response to said outputting, at least one of (i) user feedback and (ii) one or more user instructions.

16. The computer program product of claim 14, wherein said deriving is performed recursively until at least one of (i) a detection of a contradiction among the one or more known truth values and (ii) a determination that no unknown truth value can be derived.

17. A system comprising:
    a memory; and
    at least one processor operably coupled to the memory and configured for:
        parsing one or more descriptions of one or more user-provided constraints pertaining to data within a target system;
        parsing truth value assignments to at least a portion of the one or more user-provided constraints;
        deriving a truth value for at least one of the one or more user-provided constraints that does not correspond to a known truth value, wherein said deriving comprises performing a logical inference utilizing one or more known truth values of one or more constraints related to the one or more user-provided constraints;
        storing, in a database, (i) the one or more user-provided constraints, (ii) the one or more known truth values, and (iii) the at least one derived truth value; and
        outputting, to at least one user, at least one of (i) the at least one derived truth value, (ii) one or more identified contradictions among the one or more known truth values, and (iii) an indication that one or more unknown truth values corresponding to one or more of the user-provided constraints remain unknown.

18. The system of claim 17, wherein said deriving is performed recursively until at least one of (i) a detection of a contradiction among the one or more known truth values and (ii) a determination that no unknown truth value can be derived.

19. A computer-implemented method comprising steps of:

obtaining, from at least one user, one or more descriptions of a set of one or more data constraints pertaining to data within a target system;

parsing the one or more descriptions into one or more data representations from a set of multiple pre-established data representations;

determining a truth value for at least one of the one or more data constraints by validating the one or more data representations against the data within the target system;

identifying one or more contradictions among the one or more determined truth values by performing a logical inference on (i) the at least one determined truth value and (ii) one or more previously-assigned truth values associated with the one or more user-provided data constraints;

outputting the one or more identified contradictions to at least one user;

updating the set of one or more data constraints, based on user input in response to the one or more identified contradictions, by at least one of (i) adding one or more data constraints, (ii) removing at least one of the one or more data constraints, and (iii) modifying at least one of the one or more previously assigned truth values; and repeating, using the updated set of one or more data constraints, the steps of (i) obtaining, (ii) parsing, (iii) determining, (iv) identifying, and (v) outputting;

wherein the steps are carried out by at least one computing device.

20. The computer-implemented method of claim 19, wherein said repeating further comprises repeating the step of updating the set of one or more data constraints.

* * * * *